Figure 1:
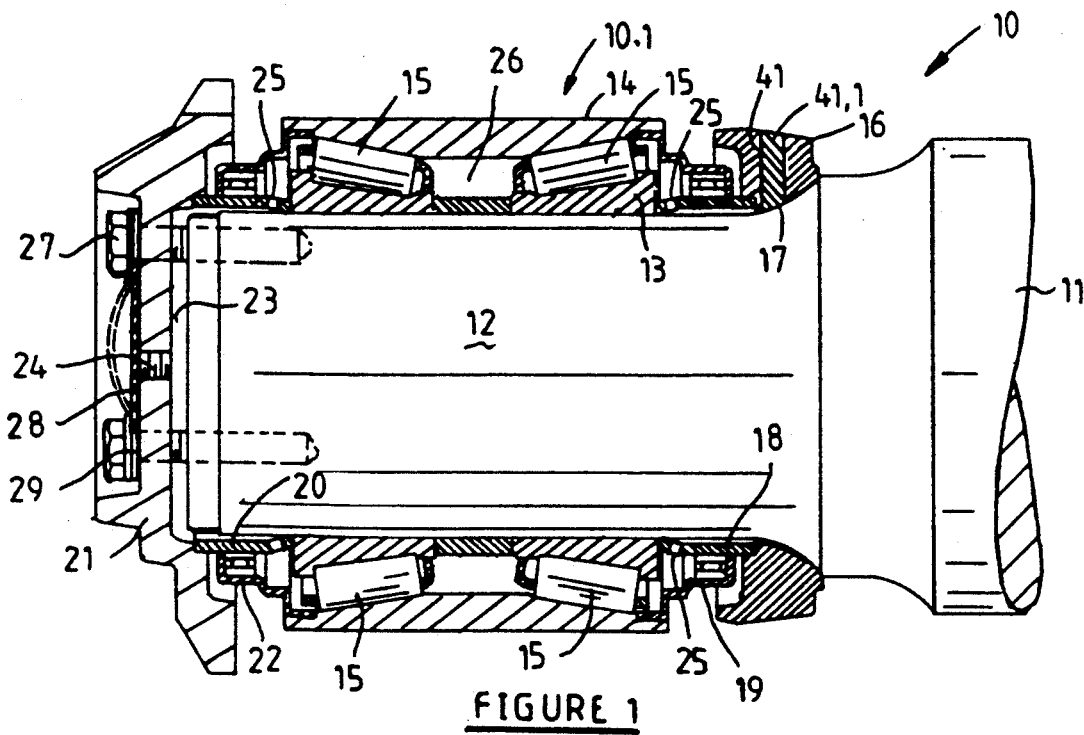

United States Patent [19]

Van Tonder

[11] Patent Number: 5,141,340

[45] Date of Patent: Aug. 25, 1992

[54] ROLLER BEARING

[76] Inventor: Frederik S. Van Tonder, P.O. Box 32296, Glenstantia, South Africa, 0010

[21] Appl. No.: 627,316

[22] Filed: Dec. 14, 1990

[30] Foreign Application Priority Data

Dec. 18, 1989 [ZA] South Africa .................. 89/9675
Jun. 8, 1990 [ZA] South Africa .................. 90/4417

[51] Int. Cl.⁵ ..................... F16C 33/66; F16C 33/78
[52] U.S. Cl. ................................ 384/462; 384/473; 384/479
[58] Field of Search ............ 384/462, 474, 475, 477, 384/479, 489, 493, 557, 905; 277/34, 34.3, 29

[56] References Cited

U.S. PATENT DOCUMENTS

| 3,330,563 | 7/1967 | De Puydt et al. | 384/489 X |
| 4,073,548 | 2/1978 | Walters | 384/479 X |
| 4,368,933 | 1/1983 | Motsch | 384/489 X |
| 4,778,285 | 10/1988 | Larson | 384/462 X |
| 4,784,500 | 11/1988 | Prokop | 384/462 |

FOREIGN PATENT DOCUMENTS

| 650845 | 10/1962 | Canada | 384/479 |
| 261517 | 10/1989 | Japan | 384/479 |

Primary Examiner—Thomas R. Hannon
Attorney, Agent, or Firm—Fish & Richardson

[57] ABSTRACT

A roller bearing 10 for an axle is disclosed and claimed. The bearing comprises a housing 10.1 including inner and outer rings 13 and 14 with rollers 15 mounted between them. The housing defines a void 26, 25, 23 communicating with a port 24 defined in the housing and which void extends between the rollers. The bearing also comprises a resiliently expandable fluid impermeable closure 28 for the port 24, so that the housing and closure 28, in use, define a sealed variable volume void. The closure as such is also claimed.

18 Claims, 3 Drawing Sheets

ROLLER BEARING

This invention relates t and more particularly to roller bearings.

Known roller bearings for railway axle journals comprise parallel or tapered rollers mounted between inner and outer rings. The inner ring is mountable on the journal which is located towards the end of the axle. The bearing also comprises an axle end cap securable to the end of the axle. Lubrication passages are defined between the end cap and the axle as well as between adjacent rollers. A lubrication port stopable by a rigid plug is provided in the end cap to communicate with the passages. Another port or vent also communicating with the passages, may be defined in a backing ring which abuts against a shoulder on the axle.

During use, the temperature of the bearing increases causing air and gasses, emanating from the lubricant, in the passages to expand and to escape through the latter port. As the temperature decreases, air is drawn back into the passages through that port. At the same time, dirt and moisture may also enter the bearing through the aforementioned port. It is known that this dirt and moisture causes the bearing to wear and regular maintenance is consequently required on these bearings.

Other so-called sealed bearings without a port in the backing ring or end cap are also known, but in these cases the pressure of the hot air and gasses may rise to such a level that it eventually escapes past seals on the bearing. Moisture may thus still enter the passages past the seals when the bearing cools down.

It is an object of the present invention to provide a roller bearing with which the aforementioned problems may at least be alleviated.

According to the invention there is provided a roller bearing for an axle comprising a housing including inner and outer rings with rollers mounted between them, the housing defining a void communicating with a port defined in the housing and which void extends between the rollers, the bearing also comprising a resiliently expandable fluid impermeable closure for the port, so that the housing and closure, in use, define a sealed variable volume void.

The bearing may also comprise a protective cover for the closure.

The closure may comprise a resiliently flexible diaphragm mounted to cover the port.

In another embodiment the closure may comprise a hollow stopper for the port, the stopper comprising a tubular body receivable in the port and an inflatable head mounted on the body for communication therewith. The tubular body may have an external thread for cooperating with an internal thread in the port.

In yet another embodiment the closure may comprise an inflatable C-shaped bag mountable about the axle and communicating with the port via a tube.

The tube may comprise an externally threaded connector member at an end thereof remote from the bag for cooperation with an internal thread in the port.

The bag is preferably secured to a belt for mounting it about the axle. Alternatively, the bag and belt may be of unitary construction.

In this embodiment the protective cover may be of a rigid transparent material and may be provided on the belt with the bag located between the belt and the cover.

According to another aspect of the invention, there is provided a closure for a port defined in a bearing housing and which port communicates with a void defined in the housing, the closure comprising a fluid impermeable resiliently expandable member mountable to close the port thereby to define with the bearing housing a sealed variable volume void.

The closure may comprise a resiliently flexible membrane and a securing plate therefor, the securing plate defining a hole, the membrane being mountable on the bearing housing by the plate with the hole substantially in register with the port.

In another embodiment the closure comprises a hollow stopper for the port, the stopper comprising a tubular body receivable in the port and an inflatable head mounted on the body for communication therewith. The tubular body may have an external thread for cooperation with an internal thread in the port.

In yet another embodiment the closure may comprise an inflatable C-shaped or hollow torroidally shaped bag mountable about an axle and communicating with the port via a tube. The tube may comprise a connector member at an end thereof remote from the bag and which connector member is preferably a tight fit in the port.

The bag may be mounted on a belt for securing it about an axle. Alternatively, the bag and belt may be of unitary construction.

The bag may be located between the belt and a protective cover of a rigid and transparent material.

Figure 2:
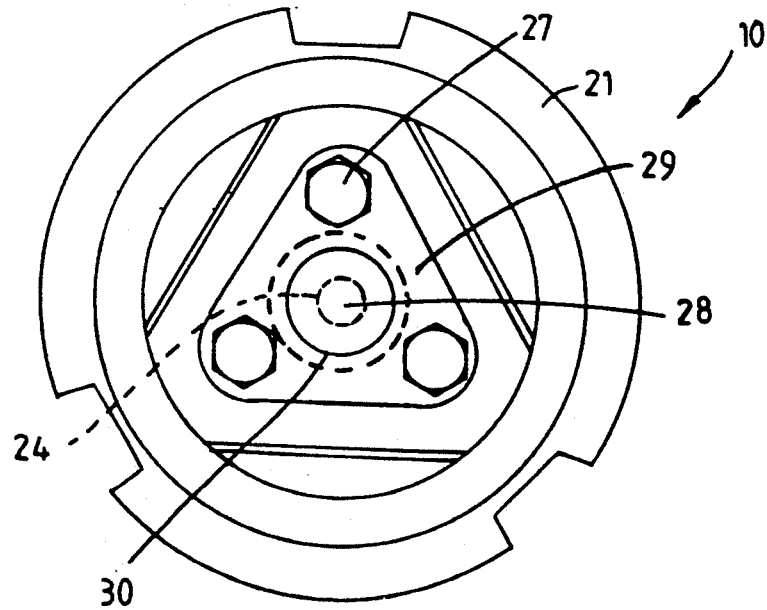
Figure 3A:
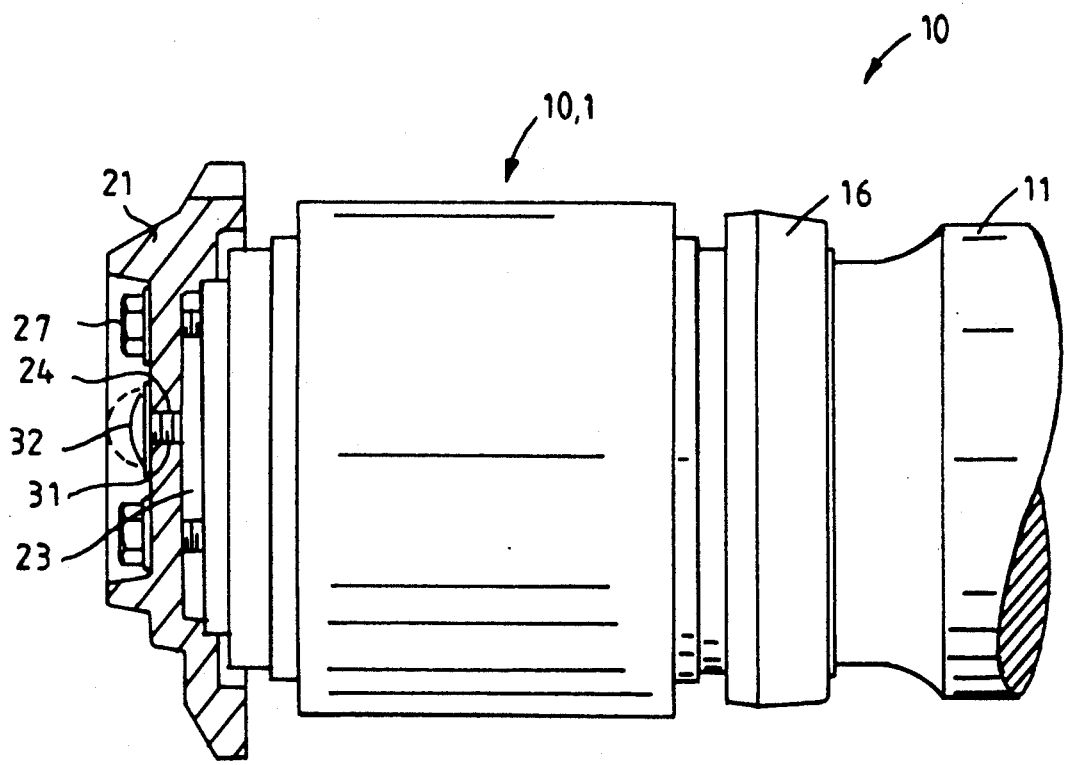
Figure 3B:
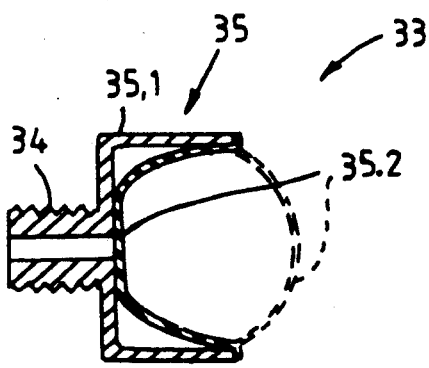
Figure 4:
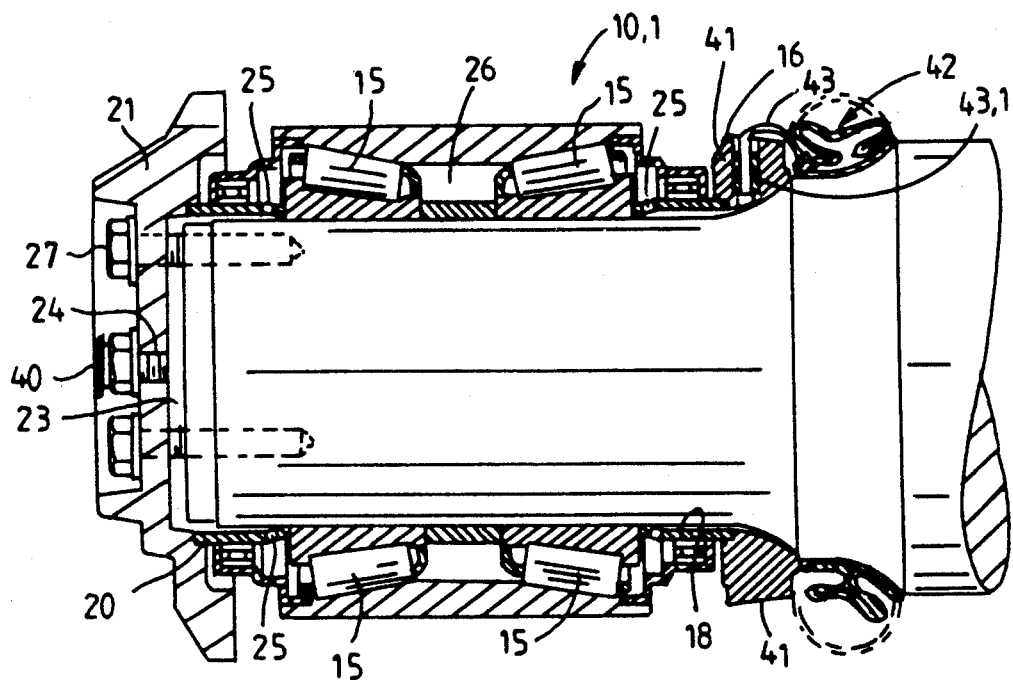
Figure 5:
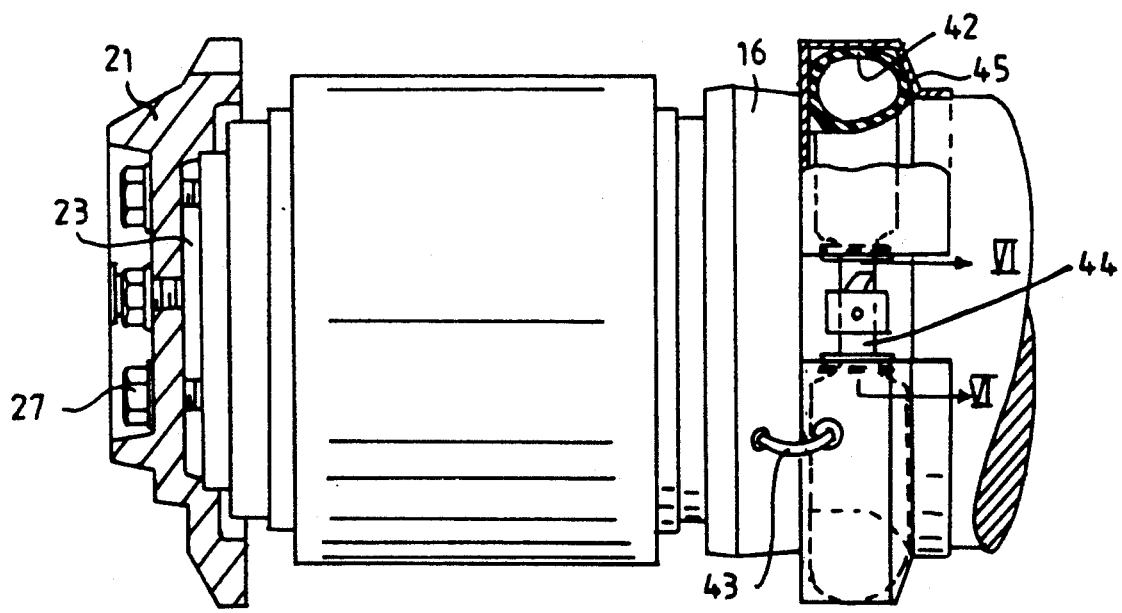
Figure 6:
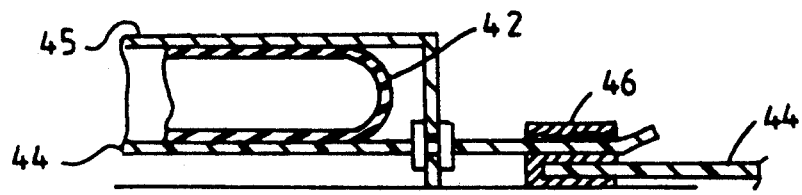

The invention will now further be described, by way of example only, with reference to the accompanying diagrams wherein:

FIG. 1: is a diagrammatic longitudinal section through a roller bearing according to the invention showing a first embodiment of a closure for a lubrication port defined in the bearing housing;

FIG. 2: is a diagrammatic end view of the bearing in FIG. 1;

FIG. 3a: is a diagrammatic partially sectional view of a bearing according to the invention showing a second embodiment of the closure for the lubrication port in the bearing housing;

FIG. 3b: is a diagrammatic sectional view of an alternative shape of the second embodiment of the closure for the lubrication port defined in the bearing housing; and FIG. 4: is a diagrammatic longitudinal section through a roller bearing according to the invention showing a third embodiment of a closure for a port defined in the bearing housing;

FIG. 5: is a diagrammatic side view of the bearing in FIG. 4, illustrating the closure in more detail; and FIG. 6: is a sectional view on line VI in FIG. 5.

A roller bearing according to the invention is generally designated by the reference numeral 10 in FIGS. 1 to 3a.

Bearing 10 is mounted on an axle 11 having a journal at one end 12 thereof. The bearing comprises a housing 10.1 wherein an inner ring 13 and an outer ring 14 are mounted. Rollers 15 are mounted between rings 13 and 14. Backing ring 16 abuts against shoulder 17 on axle 11. A rear seal wear ring 18 is provided between inner ring 13 and backing ring 16, while a seal 19 is mounted between outer ring 14 and rear seal wear ring 18.

A front seal wear ring 20 is provided between inner ring 13 and axle end cap 21. Seal 22 is provided between outer ring 14 and front seal wear ring 20. Between end cap 21 and the end of axle 11 there is defined a clearance 23 and in end cap 21 there is defined a lubrication port 24 communicating with clearance 23.

Clearance 23 in turn communicates via internal ports 25 with void 26. Void 26 extends from the axle end cap 21 rearwardly to backing ring 16. It also extends between the rollers 15 and between the aforementioned inner and outer rings. Another port or vent 41, defined in backing ring 16, and which is stopped by a rigid stopper 41.1, also communicates with void 26 via internal ports 25.

End cap 21 is mounted on the end of axle 11 by bolts 27.

Port 24 is covered by a closure in the form of a diaphragm 28 made of a resiliently flexible and fluid impermeable material. The diaphragm 28 is mounted on the end cap 21 by a plate 29 defining a hole 30 which is larger than the port 24. The region of plate 29 circumscribing hole 30 pinches an annular peripheral region of the diaphragm 28 onto end cap 21.

The bearing housing comprising inner ring 13, outer ring 14, end cap 21 and backing ring 16 together with diaphragm 28 therefore define a sealed, variable volume void comprising port region 24, clearance 23, ports 25, void 26, and the region adjacent port 41.

During use, the temperature of the bearing increases causing the air and gasses, emanating from the lubricant, in the sealed void to expand. Instead of escaping through the port 41 in the backing ring 16, as in the known bearings, diaphragm 28 expands or bulges outwardly as shown in dotted lines in FIG. 1 to accommodate the expanding air. As the bearing cools off, the diaphragm returns to its normal position as shown in solid lines in FIG. 1. Because of the sealed nature of the bearing very little or no moisture or dirt enters the bearing during the cooling off of the bearing.

In FIG. 3a there is shown the same bearing as in FIG. 1, except for the closure for lubrication port 24. The closure of the bearing in FIG. 3a comprises an externally threaded tube 31 co-operating with a thread in port 24. On tube 31, there is provided an inflatable head 32 of a resiliently flexible material.

As the temperature of the bearing increases, the volume of head 32 increases as shown in dotted lines in FIG. 3a. However, as the temperature decreases, the head returns to its normal shape as shown in solid lines in FIG. 3a.

The closure, in either of its aforementioned forms may be used as visible indicator means of the proper working of bearing 10 in that the size and rate of expansion of the closure is indicative of heat generated by bearing 10.

Another form of the closure for lubrication port 24 is designated by the reference numeral 33 in FIG. 3b. This closure also comprises a threaded tubular member 34 and an inflatable head 35. Head 35 has a rigid outer wall 35.1 and a flexible inner wall 35.2.

In FIGS. 4 to 6 there is shown a third embodiment of the bearing according to the invention and the closure according to the invention. In these figures, parts corresponding to the parts of the bearings in FIGS. 1 to 3a are designated by like reference numerals.

The only differences between the bearing of FIGS. 4 and 5 on the one hand and those of FIGS. 1 to 3a on the other, are the location of the port provided with an expandable closure and the configuration of the closure itself.

In the bearing in FIGS. 4 and 5, lubrication port 24 is closed by a rigid lubrication plug 40.

The closure for port 41 comprises a C-shaped inflatable bag 42 mountable about axle 11. Bag 42 communicates with vent 41 via tube 43. At the end of tube 43 remote from bag 42 there is provided a connector member 43.1 which is a tight fit in port 41.

Bag 42 is secured to a belt 44 for mounting the bag about axle 11. Also secured to belt 44 is a protective cover 45 of a rigid, transparent material. In use, the bag 42 is located between the belt 44 and the cover 45. Belt 44 is fastened on axle 11 by means of serrated fastening means 46.

During use, the temperature of the bearing increases, causing the gasses in the sealed void 26 to expand. Bag 42 is inflated causing it to adopt the configuration shown in dotted lines in FIG. 4. As the bearing cools off, the bag returns to its normal configuration shown in solid lines in FIG. 4. Because of the sealed nature of the bearing, very little or no moisture or dirt enters the bearing during the cooling off of the bearing.

It will be appreciated that there are many variations in detail possible on the bearing and closure according to the invention without departing from the scope and spirit of the appended claims.

I claim:

1. A sealed roller bearing comprising
   a housing comprising inner and outer rings, and rollers mounted between said rings, said housing defining an internal void defining a volume and extending between said rollers, and said volume of said internal void, in use, being at least partially occupied by a gas;
   a port defined in said housing and communicating with said internal void; and
   a distendable, fluid-tight closure for said port, said closure adapted to seal said internal void in fluid-tight manner so that said void does not have any vent to atmosphere;
   said volume of said internal void, in use, adapted to change in accordance with change in temperature within said internal void, thereby to compensate for change in pressure within said internal void without venting of gas from said volume of said internal void or admitting of external gas into said volume of said internal void.

2. A bearing as claimed in claims 1 comprising a protective cover for the closure.

3. A roller bearing as claimed in claim 1 or claim 2 wherein the closure comprises a resiliently flexible diaphragm mounted to cover the port.

4. A roller bearing as claimed in claim 1 or claim 2 wherein the closure comprises a hollow stopper for the port, the stopper comprising a tubular body receivable in the port and an inflatable head mounted on the body for communication therewith.

5. A roller bearing as claimed in claim 4 wherein the tubular body has an external thread for cooperating with an internal thread in the port.

6. A closure for a port defined in a bearing housing and which port communicates with a void defined in the housing, the closure comprising a distendable member made of a fluid impermeable, flexible material mounted on the bearing housing to close the port thereby to define with the bearing housing a sealed variable volume void.

7. A closure as claimed in claim 6 comprising a resiliently flexible membrane and a securing plate therefor, the securing plate defining a hole, the membrane being mountable on the bearing body by the plate with the hole substantially in register with the port.

8. A closure as claimed in claim 6 comprising a hollow stopper for the port, the stopper comprising a tubular body receivable in the port and an inflatable head mounted on the body for communication therewith.

9. A closure as claimed in claim 8 wherein the tubular body has an external thread for cooperation with an internal thread in the port.

10. A roller bearing comprising a housing including inner and outer rings with rollers mounted between them, the housing defining a void communicating with a port defined in the housing and which void extends between the rollers, the bearing also comprising a resiliently expandable fluid impermeable closure for the port, so that the housing and closure, in use, define a sealed variable volume void, said closure comprising an inflatable C-shaped bag mountable about the axle and communicating with the port via a tube.

11. A roller bearing as claimed in claim 10 wherein the bag is secured to a belt for mounting it about the axle.

12. A roller bearing as claimed in claim 11 wherein a protective cover made of a rigid, transparent material is secured to the belt to protect the bag.

13. A roller bearing as claimed in claim 10 further comprising a protective cover for the closure.

14. A rolelr bearing as claimed in claim 13 wherein the bag is secured to a belt for mounting it about the axle.

15. A roller bearing as claimed in claim 14 wherein said protective cover is secured to the belt and is made of a rigid, transparent material.

16. A closure for a port defined in a bearing housing and which port communicates with a void defined in the housing, the closure comprising a distendable member made of a fluid impermeable, flexible material mounted on the bearing housing to close the port thereby to define with the bearing housing a sealed variable volume void, said closure comprising an inflatable C-shaped bag mountable about an axle and communicating with the port via a tube.

17. A closure as claimed in claim 16 wherein the bag is mounted on a belt for securing it about an axle.

18. A closure as claimed in claim 17 wherein the bag is located between the belt and a protective cover of a rigid material.

* * * * *

UNITED STATES PATENT AND TRADEMARK OFFICE
CERTIFICATE OF CORRECTION

PATENT NO. : 5,141,340
DATED : August 25, 1992
INVENTOR(S) : Frederik S. Van Tonder It is certified that error appears in the above-indentified patent and that said Letters Patent is hereby corrected as shown below:

Col. 1, Line 4, "t" should be --to--.

Col. 1, Line 4, insert --bearings-- after "to".

Signed and Sealed this

Nineteenth Day of October, 1993

Attest:

BRUCE LEHMAN

*Attesting Officer*     *Commissioner of Patents and Trademarks*